US012783193B2

(12) United States Patent
Fu et al.

(10) Patent No.: US 12,783,193 B2
(45) Date of Patent: Nov. 3, 2026

(54) METHOD, APPARATUS, ELECTRONIC DEVICE AND STORAGE MEDIUM FOR INTERACTION

(71) Applicant: Beijing Youzhuju Network Technology Co., Ltd., Beijing (CN)

(72) Inventors: Qiang Fu, Beijing (CN); Haoyu Zhang, Beijing (CN); Jiali Hu, Beijing (CN); Zhiyao Xie, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 127 days.

(21) Appl. No.: 18/807,630

(22) Filed: Aug. 16, 2024

(65) Prior Publication Data

US 2025/0060922 A1 Feb. 20, 2025

(30) Foreign Application Priority Data

Aug. 18, 2023 (CN) ........................ 202311049853.X

(51) Int. Cl.
*H04N 21/4788* (2011.01)
*G06F 3/14* (2006.01)

(52) U.S. Cl.
CPC ...................................... *G06F 3/14* (2013.01)

(58) Field of Classification Search
None
See application file for complete search history.

(56) References Cited

U.S. PATENT DOCUMENTS

2024/0422399 A1* 12/2024 Chiu ................ H04N 21/47217

FOREIGN PATENT DOCUMENTS

| | | | |
|---|---|---|---|
| CN | 111353839 | A | 6/2020 |
| CN | 113438531 | A | 9/2021 |
| CN | 113450193 | A | 9/2021 |
| CN | 113784156 | A | 12/2021 |
| CN | 113935813 | A | 1/2022 |
| CN | 115543162 | A | 12/2022 |
| WO | 2018036456 | A1 | 3/2018 |

OTHER PUBLICATIONS

International Search Report and the Written Opinion for International Application No. PCT/CN2024/112893, mailed on Nov. 1, 2024, 7 pages.

* cited by examiner

*Primary Examiner* — Carl Adams
(74) *Attorney, Agent, or Firm* — Astute IP Law Group

(57) ABSTRACT

Embodiments of the disclosure provide a method, apparatus, electronic device and storage medium for interaction. The method includes: receiving an explanation operation of a current user in a live streaming page, the current user being a live streamer of a live session corresponding to the live streaming page, and at least one recommendation object being present in the live session; in response to the explanation operation, determining a first recommendation object corresponding to the explanation operation in the at least one recommendation object; and displaying a first explanation card corresponding to the first recommendation object on the live streaming page, the first explanation card being used to switch an object state of the first recommendation object, and the object state comprising an explained state and an unexplained state.

18 Claims, 7 Drawing Sheets

METHOD, APPARATUS, ELECTRONIC DEVICE AND STORAGE MEDIUM FOR INTERACTION

CROSS-REFERENCE

The present application claims priority to Chinese Patent Application No. 202311049853.X, filed on Aug. 18, 2023, and entitled "METHOD, APPARATUS, ELECTRONIC DEVICE AND STORAGE MEDIUM FOR INTERACTION", the entirety of which is incorporated herein by reference.

FIELD

Embodiments of the present disclosure relate to the field of computer technologies, and in particular, to a method, apparatus, electronic device and storage medium for interaction.

BACKGROUND

Currently, a live streamer may open a product panel of a live session in a live streaming page, and adjust a state of a product in the live session in the product panel, for example, adjust the product to an explained state or an unexplained state. However, the manner of adjusting the product state in the existing technology is cumbersome, which is not conducive to the live streamer to quickly adjust the product state.

SUMMARY

The embodiments of the present disclosure provide a method, apparatus, electronic device and storage medium for interaction, to simplify operations required for a live streamer to adjust a state of a product in a live session.

In a first aspect, the embodiments of the present disclosure provide a method of interaction, including: receiving an explanation operation of a current user in a live streaming page, the current user being a live streamer of a live session corresponding to the live streaming page, and at least one recommendation object being present in the live session; in response to the explanation operation, determining a first recommendation object corresponding to the explanation operation in the at least one recommendation object; and displaying a first explanation card corresponding to the first recommendation object on the live streaming page, the first explanation card being used to switch an object state of the first recommendation object, and the object state comprising an explained state and an unexplained state.

In a second aspect, the embodiments of the present disclosure further provide an apparatus for interaction, including: an operation receiving module configured to receive an explanation operation of a current user in a live streaming page, the current user being a live streamer of a live session corresponding to the live streaming page, and at least one recommendation object being present in the live session; an object determination module configured to, in response to the explanation operation, determine a first recommendation object corresponding to the explanation operation in the at least one recommendation object; and a card display module configured to display a first explanation card corresponding to the first recommendation object on the live streaming page, the first explanation card being used to switch an object state of the first recommendation object, and the object state comprising an explained state and an unexplained state.

In a third aspect, the embodiments of the present disclosure further provide an electronic device, including: one or more processors; and a memory configured to store one or more programs, and when the one or more programs are executed by the one or more processors, the one or more processors implement the method of interaction according to the embodiments of the present disclosure.

In a fourth aspect, the embodiments of the present disclosure further provide a computer-readable storage medium having a computer program stored thereon, the program, when executed by a processor, implements the method of interaction according to the embodiments of the present disclosure.

The method, apparatus, electronic device and storage medium for interaction provided by the embodiments of the present disclosure receives an explanation operation of a current user in a live streaming page, the current user being a live streamer of a live session corresponding to the live streaming page, and at least one recommendation object being present in the live session; in response to the explanation operation, determines a first recommendation object corresponding to the explanation operation in the at least one recommendation object; and displays a first explanation card corresponding to the first recommendation object on the live streaming page, the first explanation card being used to switch an object state of the first recommendation object, and the object state comprising an explained state and an unexplained state. The embodiments of the present disclosure adopt the above-mentioned technical solution to display an explanation card in the live streaming page on the live streamer side, and supports the live streamer to switch the object state of the corresponding recommendation object through the explanation card. There is no need to open the recommendation object panel of the live session and switch the object state in the recommendation object panel, which can simplify the operations required to switch the object states of the recommendation objects in the live broadcast room.

BRIEF DESCRIPTION OF DRAWINGS

The above and other features, advantages, and aspects of various embodiments of the present disclosure will become more apparent from the following detailed description taken in conjunction with the accompanying drawings. Throughout the drawings, the same or similar reference numerals refer to the same or similar elements. It should be understood that the drawings are schematic, and elements and elements are not necessarily drawn to scale.

DETAILED DESCRIPTION

Figure 1:
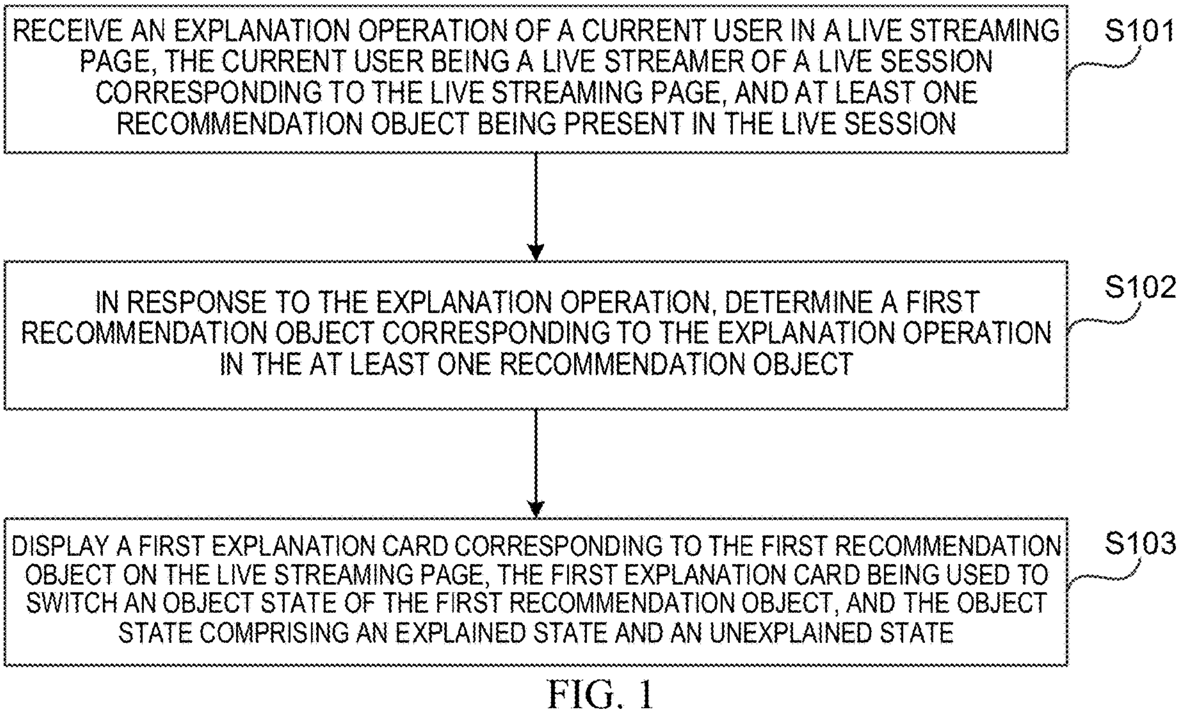
FIG. 1 is a schematic flowchart of a method of interaction according to the embodiments of the present disclosure.

The embodiments of the present disclosure will be described in more detail below with reference to the accompanying drawings. While certain embodiments of the present disclosure are shown in the drawings, it is to be understood that the present disclosure may be implemented in various forms and should not be construed as limited to the embodiments set forth herein, and vice versa. It should be understood that the drawings and embodiments of the present disclosure are for example purposes only and are not intended to limit the scope of the present disclosure.

It should be understood that the steps described in the method embodiments of the present disclosure may be performed in a different order and/or in parallel. Furthermore, the method embodiments may include additional steps and/or omit performing the illustrated steps. The scope of the present disclosure is not limited in this respect.

As used herein, the term "include" and its variants should be construed as open terms meaning "including, but not limited to". The term "based on" means "at least partially based on". The term "one embodiment" means "at least one embodiment". The term "another embodiment" means "at least one another embodiment". The terms "some embodiments" means "at least some embodiments". Related definitions of other terms will be given in the following descriptions.

It should be noted that the concepts of "first", "second" and the like mentioned in the present disclosure are used only to distinguish different apparatuses, modules or units but not to limit the order or interdependence of the functions performed by these apparatuses, modules or units.

It should be noted that the modifications of "a" and "a plurality" mentioned in the present disclosure are schematic rather than limiting, and it should be understood by those skilled in the art that unless otherwise explicitly stated in the context, they should be understood as "one or more".

The names of messages or information interaction between multiple devices in the embodiments of the present disclosure are for illustrative purposes only and are not intended to limit the scope of such messages or information.

It is to be understood that, before applying the technical solutions disclosed in various embodiments of the present disclosure, the user should be informed of the type, scope of use, and use scenario of the personal information involved in the subject matter of the present disclosure in an appropriate manner in accordance with relevant laws and regulations, and user authorization should be obtained.

For example, in response to receiving an active request from the user, prompt information is sent to the user to explicitly inform the user that the requested operation would obtain and use the user's personal information. Therefore, according to the prompt information, the user may decide on his/her own whether to provide the personal information to the software or hardware, such as electronic devices, applications, servers, or storage medium that perform operations of the technical solutions of the present disclosure.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

FIG. 1 is a schematic flowchart of a method of interaction according to the embodiments of the present disclosure. The method may be performed by an apparatus for interaction, where the apparatus may be implemented by software and/or hardware, may be configured in an electronic device, and is typically configured in a mobile phone or a tablet computer. The method of interaction provided by the embodiments of the present disclosure is suitable for displaying the scene of the explanation card of the recommendation object in the live session in the live streaming page on the live streamer side. As shown in FIG. 1, the method of interaction provided in this embodiment may include the following steps.

At S101: receive an explanation operation of a current user in a live streaming page, the current user being a live streamer of a live session corresponding to the live streaming page, and at least one recommendation object being present in the live session.

The explanation operation may be an operation for instructing to explain a certain recommendation object in the live session, for example, an operation of triggering an explanation control corresponding to a certain recommendation object in the recommendation object panel. The explanation operation may be performed by a live streamer of a live session on a live streaming page of a live session. The current user may be a user performing the explanation operation, which may be the live streamer of the live session. The live streaming page may be a live streaming page of the live session of the current user, for example, a page used by the current user side to display the live streaming image of the current user and the interactive information in the live session. There may be one or more recommendation object in the live session of the current user, and the recommendation object may be considered as an object that is recommended by the current user in the live session, for example, a product recommended by the current user in the live session.

In this embodiment, if the current user intends to explain a certain recommendation object in the live session, the explanation operation may be performed in the live streaming page of the live session, for example, the explanation control corresponding to the recommendation object in the recommendation object panel is triggered. Correspondingly, the current application may perform the explanation operation performed by the current user.

At S102, in response to the explanation operation, determine a first recommendation object corresponding to the explanation operation in the at least one recommendation object.

The first recommendation object may be understood as a recommendation object corresponding to the received explanation operation in the live session, for example, a recommendation object corresponding to the explanation control acted on by the explanation operation in the recommendation object panel.

Specifically, when receiving the explanation operation of the current user in the live streaming page, the recommended object whose corresponding explanation card needs to be displayed in the live streaming page in the live session may be determined based on the explanation operation, that is, the first recommendation object corresponding to the explanation operation is determined.

At S103: display a first explanation card corresponding to the first recommendation object on the live streaming page, the first explanation card being used to switch an object state of the first recommendation object, and the object state comprising an explained state and an unexplained state.

The first explanation card may be an explanation card corresponding to the first recommendation object. The content displayed in the explanation card is not limited, for example, the explanation card may display the first object information of the corresponding recommendation object. At this time, optionally, the first explanation card displays first object information of the first recommendation object, where the first object information includes at least one of object description information or resource attribute information. The first object information may be considered as object information displayed in the explanation card. The object information may include object description information and/or resource attribute information of the corresponding recommendation object. The object description information of the recommendation object may be information describing an object attribute of the recommendation object, such as an image and/or headline of the recommendation object. The resource attribute information may be related information of a resource attribute of the recommendation object, such as inventory information, sales information, and/or price information of the recommendation object. The inventory information may include, for example, information related to the inventory, such as the remaining inventory quantity (that is, the remaining saleable quantity) of the recommendation object, where the sales information may include, for example, the sales quantity of the corresponding recommendation object that has been sold and other information related to sales.

In addition, an interaction control for switching an object state of the first recommendation object may also be displayed in the first explanation card. The display position of the first object information and the interaction control in the first explanation card may be set as needed.

Optionally, the first explanation card includes an information area and an interaction area. The information area is used to display at least part of first object information of the first recommendation object. The interaction area is used to display a state switching control, and the state switching control is used to trigger an execution state switching operation.

For example, the first explanation card may include an information area and an interaction area, and the information area may be located above the interaction area. The information area may be used to display at least part of first object information of the first recommendation object, for example, the information area may include a first sub-area and a second sub-area, the first sub-area may be located above the second sub-area, and the first sub-area may be used to display object description information of the first recommendation object, for example, an image and a title for displaying the first recommendation object; and the second sub-area may be used to display at least part of resource attribute information of the first recommendation object, for example, used to display the inventory information and the sales information of the first recommendation object. The interaction area may be used to display a state switching control, and the state switching control may be used to trigger an execution state switching operation. Optionally, the state switching control may display price information of the first recommendation object.

The object state of the recommendation object may be a state used to represent whether the live streamer explains the recommendation object, and the object state may include an explained state and an unexplained state, which may be switched by the live streamer. The explained state may be used to represent that the live streamer explains the corresponding recommendation object; and the unexplained state may be used to represent that the live streamer does not currently explain the corresponding recommendation object.

Figure 2:
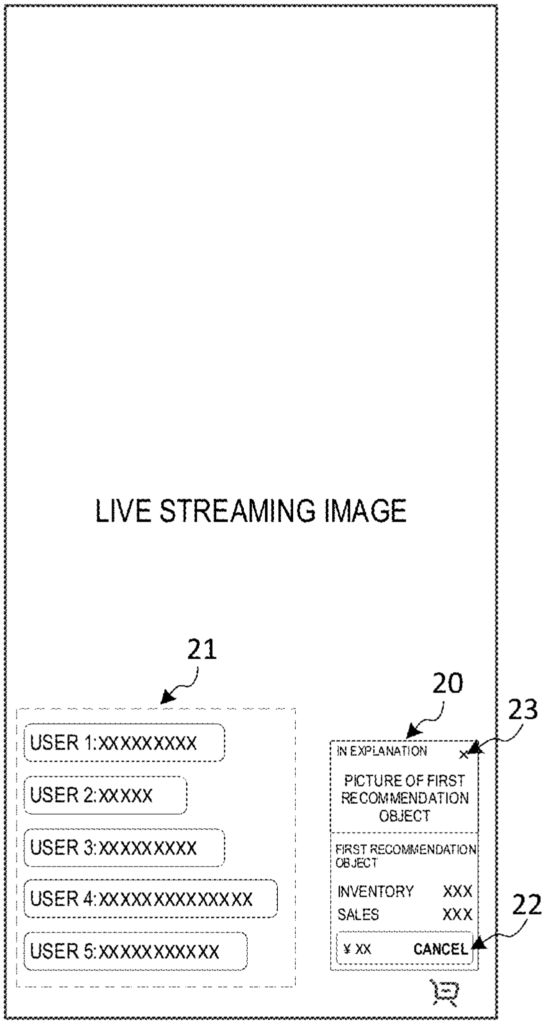
FIG. 2 is a schematic diagram of a display of a first explanation card according to the embodiments of the present disclosure.

Specifically, as shown in FIG. 2, after the first recommendation object corresponding to the explanation operation is determined, a first explanation card 20 corresponding to the first recommendation object may be displayed on the live streaming page, so that the current user switches the object state of the first recommendation object through the first explanation card 20; and the first object information such as the object description information and/or the resource attribute information of the first recommendation object may be further displayed in the first explanation card 20, so that the live streamer clarifies the current sales situation of the first recommendation object.

In this embodiment, the display area where the first explanation card 20 is located in the live streaming page is not limited, as shown in FIG. 2, the display area of the first explanation card 20 may be located outside an interaction information area 21 of the live streaming page, that is, the first explanation card 20 may be displayed outside the interaction information area 21 in the live streaming page, so as to avoid occlusion the interaction information displayed in the live streaming page, so that the live streamer can simultaneously view the interaction information in the first explanation card 20 and the live streaming page. At this time, optionally, the first explanation card is displayed outside the interaction information area 21 of the live streaming page, and the interaction information area 21 is a display area of the interaction information in the live streaming page. The interaction information area 21 may be an area in the live streaming page that is used to display the interaction information. The interaction information may be sent within the live session by the user in the live session, for example, the interaction information may be comment information sent within the live session by the user in the live session.

Figure 3:
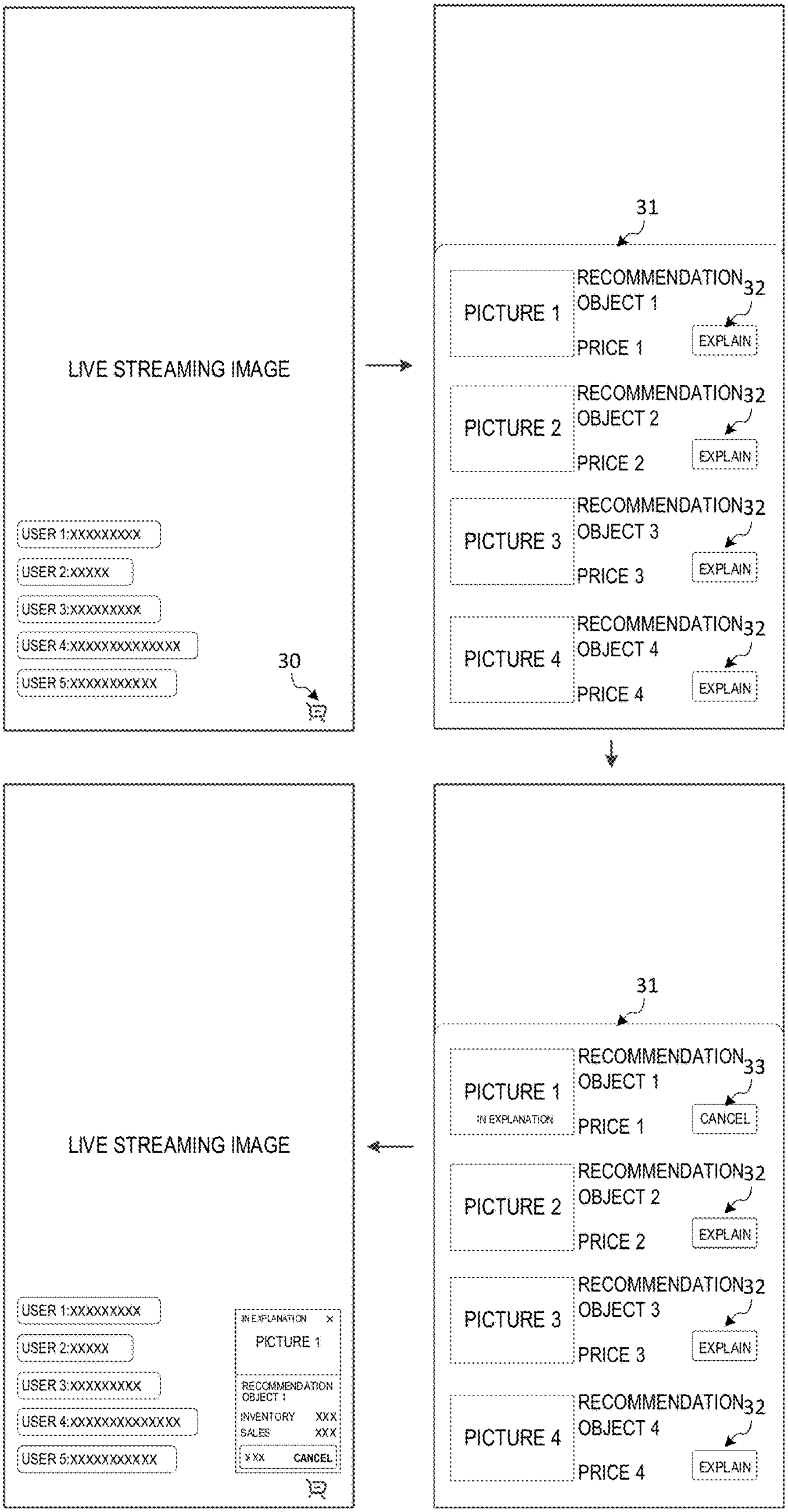
FIG. 3 is a schematic diagram of an execution manner of an explanation operation according to the embodiments of the present disclosure.

In an optional implementation, as shown in FIG. 3 (the figure takes the example that there is no recommendation object in the explanation state before receiving the explanation operation), the live streaming page may be presented with a panel display control 30. If it is detected that the current user triggers the panel display control 30 displayed in the live streaming page, a recommendation object panel 31 may be displayed in the live streaming page, and second object information and an explanation control 32 of the at least one recommendation object in the live session may be displayed in the recommendation object panel 31. If it is detected that the current user triggers the explanation control 32 of a certain recommendation object (such as the recommendation object 1 shown in FIG. 3), the recommendation object may be switched from the unexplained state to the explained state, and the explanation card corresponding to the recommendation object may be displayed in the live streaming page. If it is detected that the current user performs a closing operation for the recommendation object panel 31, for example, if it is detected that the non-control area outside the recommendation object panel 31 is triggered by the current user, the display of the recommendation object panel 31 may be canceled.

In addition, if it is detected that the current user triggers an explanation control 32 of a certain recommendation object, an explanation identification may further be displayed in a position corresponding to the explanation object in the recommendation object panel 31, and the explanation identification is used to indicate that the recommendation object is in the explained state; and/or the explanation control 32 is switched to a cancellation display control 33, so that the current user switches the recommendation object from the explained state to the unexplained state by triggering the cancellation display control 33.

If the explanation card corresponding to the recommendation object is displayed in the live streaming page, when it is detected that the current user triggers the explanation control 32 corresponding to a certain recommendation object, the explanation card corresponding to the recommendation object may be displayed in the live streaming page, for example, the explanation card is displayed at the bottom layer of the recommendation object panel 31, and at this time, if the current user closes the recommendation object panel 31, the explanation card located at the bottom layer thereof may be displayed.

It may be understood that, for a case in which the recommendation object panel in the live session is displayed in the live streaming page when the explanation operation is received, for example, when the explanation operation is performed in the recommendation object panel of the live session. If the explanation operation is received, the recommendation object panel may be canceled in response to the explanation operation, so that the live streamer views the first explanation card displayed in the live streaming page, the interaction information in the live session, and/or the live streaming image.

In this embodiment, if an object state of a certain recommendation object in the live session changes, for example, if a certain recommendation object is switched from the unexplained state to the explained state or switched from the explained state to the unexplained state, the display order of the second object information of the recommendation object in the recommendation object panel may be maintained unchanged or changed therewith, and may be set as required.

Optionally, when an object state of a certain recommendation object in the live session changes, the display order of the second object information of the recommendation object in the recommendation object panel may be adjusted, for example, the second object information of the recommendation object is displayed at the top of the recommendation object panel. At this time, the method of interaction provided in this embodiment may further include: upon the object state of the first recommendation object is switched, adjusting the display order of second object information of the first recommendation object in a recommendation object panel of the live session.

The recommendation object panel may be a panel for displaying object information of each recommendation object in the live session. The second object information may be considered as object information displayed in the recommendation object panel, for example, identification information of the second recommendation object. The display order of the second object information in the recommendation object panel may be understood as an arrangement order when the second object information is displayed in the recommendation object panel.

In some embodiments, the upon the object state of the first recommendation object is switched, adjusting the display order of the second object information of the first recommendation object in a recommendation object panel of the live session comprises at least one of: in response to the first recommendation object being switched from the unexplained state to the explained state, adding the second object information of the first recommendation object at a target position in the display order and maintaining the second object information of the first recommendation object at an original position in the display order; or adjusting the second object information of the first recommendation object from the original position in the display order to the target position in the display order; or in response to the first recommendation object being switched from the explained state to the unexplained state, removing the second object information of the first recommendation object at the target position in the display order and maintaining the second object information of the first recommendation object at the original position in the display order; or adjusting the second object information of the first recommendation object from the target position in the display order to the original position in the display order.

The target position may be a predetermined position for arranging the second object information of the recommendation object currently in the explained state in the display order, for example, a head position of the display order, that is, a position of the first second object information in the display order. The original position may be an arrangement position of the second object information of the first recommendation object in the display order before the display order is adjusted, for example, an arrangement position of the second object information of the first recommendation object when there is no recommendation object in the explained state in the live session.

In the above embodiments, if a certain recommendation object is switched to the explained state, the second object information of the recommendation object may be arranged to a target position in the display order, for example, the second object information of the recommendation object is arranged to a first position of the display order, and the second object information of the recommendation object at the original position in the display order may be deleted or may be not deleted; if a certain recommendation object is switched to the unexplained state, the arrangement position of the second object information of the recommendation object in the display order may be restored.

For example, if the first recommendation object is switched from the unexplained state to the explained state, the second object information of the first recommendation object may be added at the target position in the display order, and the second object information of the first recommendation object located at the original position of the display order may be kept unchanged, at this time, the second object information of the first recommendation object is simultaneously arranged at the target position and the original position in the display order. Alternatively, or in addition, if the first recommendation object is switched from the explained state to the unexplained state, the second object information of the first recommendation object added at the target location may be deleted, and the second object information of the first recommendation object located at the original position of the display order may be kept unchanged.

For another example, if the first recommendation object is switched from the unexplained state to the explained state, the second object information of the first recommendation object may be moved from the original position of the display order to the target position, and at this time, only the second object information of the first recommendation object is arranged at the target position in the display order. Alternatively, or in addition, if the first recommendation object is switched from the explained state to the unexplained state, the second object information of the first recommendation object may be restored from the target location of the display order to its original position.

The method of interaction provided by the embodiment, receives an explanation operation of a current user in a live streaming page, the current user being a live streamer of a live session corresponding to the live streaming page, and at least one recommendation object being present in the live session; in response to the explanation operation, determines a first recommendation object corresponding to the explanation operation in the at least one recommendation object; and displays a first explanation card corresponding to the first recommendation object on the live streaming page, the first explanation card being used to switch an object state of the first recommendation object, and the object state comprising an explained state and an unexplained state. This embodiment adopts the above-mentioned technical solution to display an explanation card in the live streaming page of the live streamer side, and supports the live streamer to switch the object state of the corresponding recommendation object through the explanation card. There is no need to open the recommendation object panel of the live session and switch the object state in the recommendation object panel, which can simplify the operations required to switch the object state of the recommendation object in the live session.

Figure 4:
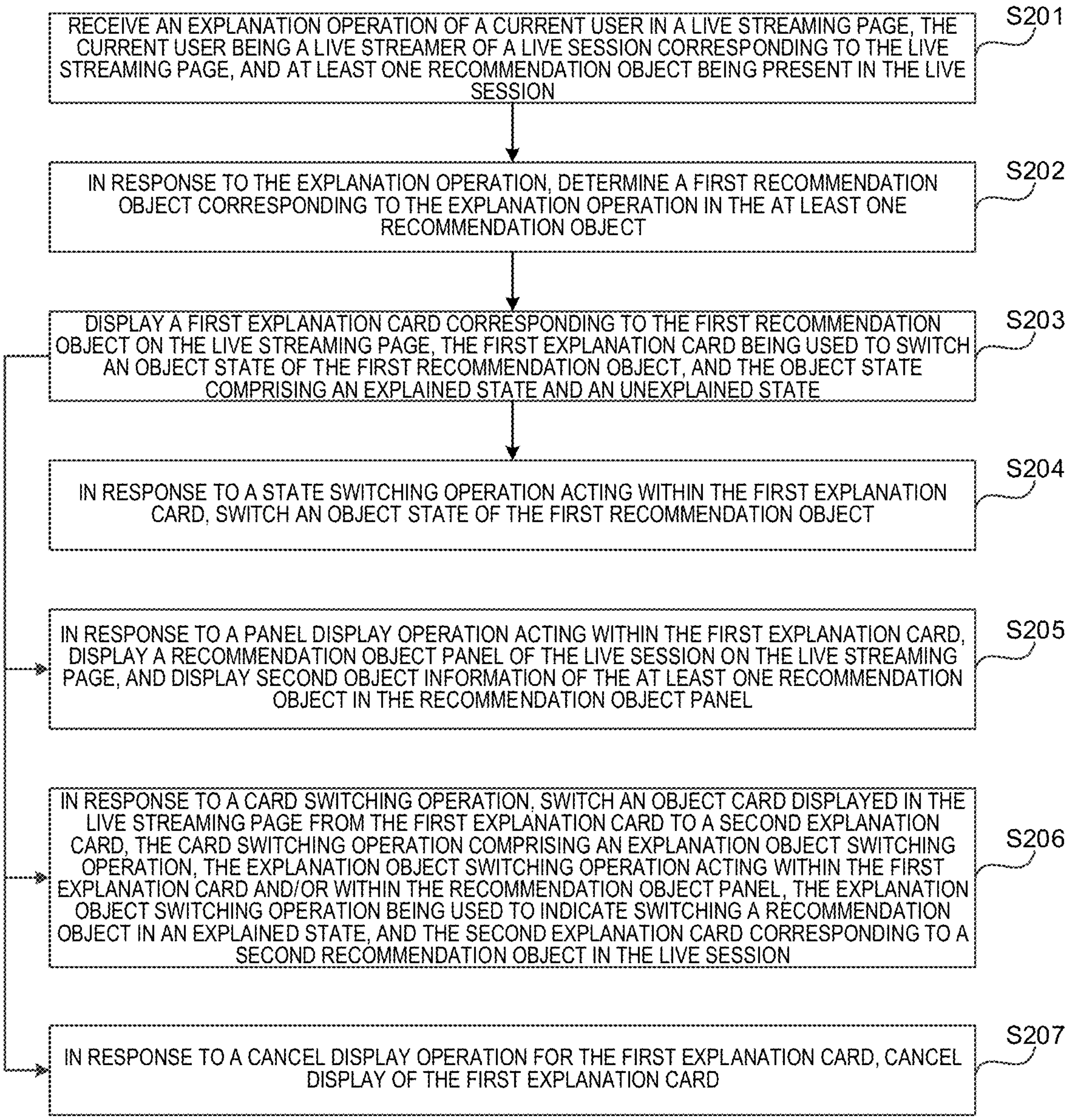
FIG. 4 is a schematic flowchart of another method of interaction according to the embodiments of the present disclosure.

FIG. 4 is a schematic flowchart of another method of interaction according to the embodiments of the present disclosure. The solution in this embodiment may be combined with one or more optional solutions in the foregoing embodiments. Optionally, after displaying the first explanation card corresponding to the first recommendation object on the live streaming page, the method further includes at least one of: in response to a state switching operation acting within the first explanation card, switching the object state of the first recommendation object; in response to a panel display operation acting within the first explanation card, displaying a recommendation object panel of the live session on the live streaming page, and displaying second object information of the at least one recommendation object in the recommendation object panel; in response to a card switching operation, switching an object card displayed on the live streaming page from the first explanation card to a second explanation card, the card switching operation comprising an explanation object switching operation, the explanation object switching operation acting within the first explanation card and/or within the recommendation object panel, the explanation object switching operation being used to indicate switching a recommendation object in an explained state, and the second explanation card corresponding to a second recommendation object in the live session; or in response to a cancel display operation for the first explanation card, canceling display of the first explanation card.

Correspondingly, as shown in FIG. 4, the method of interaction provided in this embodiment may include the following steps.

At S201: receive an explanation operation of a current user in a live streaming page, the current user being a live streamer of a live session corresponding to the live streaming page, and at least one recommendation object being present in the live session.

At S202, in response to the explanation operation, determine a first recommendation object corresponding to the explanation operation in the at least one recommendation object.

At S203, display a first explanation card corresponding to the first recommendation object on the live streaming page, performing at least one of S204-S207, where the first explanation card is used to switch an object state of the first recommendation object, and the object state comprising an explained state and an unexplained state.

In this embodiment, the explanation operation may be further used to instruct to adjust the object state of the corresponding recommendation object to the explained state. At this time, if the first explanation card corresponding to the first recommendation object is displayed in the live streaming page in response to the explanation operation of the current user, the first recommendation object may be further adjusted to the explained state, for example, the explanation identification corresponding to the first recommendation object is displayed in the recommendation object panel and/or the first explanation card. At this time, optionally, the displaying the first explanation card corresponding to the first recommendation object on the live streaming page comprises: displaying the first explanation card corresponding to the first recommendation object on the live streaming page, and adjusting the first recommendation object to the explained state.

It may be understood that, if the explanation operation of the current user is received, the first recommendation object is already in the explained state, and at this time, the first recommendation object may be kept in the explained state.

At S204, in response to a state switching operation acting within the first explanation card, switch an object state of the first recommendation object.

The state switching operation may be a trigger operation used to instruct to switch the object state of the first recommendation object. The state switching operation may be applied to, but not limited to, the first explanation card, for example, the state switching operation may also be applied within the recommendation object panel. The execution manner of the state switching operation is not limited, and the state switching operation may include an operation of triggering an explanation control and/or a cancellation explanation control displayed in the first explanation card.

In this embodiment, the user may be supported to switch the object state of the corresponding recommendation object by the explanation card to simplify the operation required to switch the object state.

Specifically, if the state switching operation acting on the first explanation card is received, the object state of the first recommendation object may be switched. For example, if the first recommendation object is in the explained state, it is switched from the explained state to the unexplained state in response to the state switching operation. If the first recommendation object is in the unexplained state, it is switched from the unexplained state to the explained state in response to the state switching operation.

In some embodiments, the in response to the state switching operation acting within the first explanation card, switching the object state of the first recommendation object includes: in response to a first state switching operation acting within the first explanation card, switching the first recommendation object from the explained state to the unexplained state, and maintaining display of the first explanation card on the live streaming page; in response to a second state switching operation acting within the first explanation card, switching the first recommendation object from the unexplained state to the explained state, and maintaining display of the first explanation card on the live streaming page.

In the above embodiment, if the first state switching operation acting on the first explanation card is received, the first recommendation object may be switched from the explained state to the unexplained state, and the first explanation card is displayed in the live streaming page; if the second state switching operation acting on the first explanation card is received, the first recommendation object may be switched from the unexplained state to the explained state, and the first explanation card is displayed in the live streaming page.

The first state switching operation and the second state switching operation may be different state switching operations. The first state switching operation may be a trigger operation for indicating that the first recommendation object is switched from the explained state to the unexplained state, for example, an operation of triggering a cancellation explanation control shown in the first explanation card. The second state switching operation may be a trigger operation used to indicate that the first recommendation object is switched from the unexplained state to the explained state, for example, an operation of triggering an explanation control displayed in the first explanation card.

For example, when the first recommendation object is in the explained state, the cancellation explanation control 22 may be displayed in the first explanation card 20, as shown in FIG. 2. Therefore, if it is detected that the cancellation explanation control 22 is triggered by the current user, it may be determined that a first state switching operation is received, in response to the first state switching operation, the first recommendation object is switched from the explained state to the unexplained state, and the cancellation explanation control shown in the first explanation card 20 may be further switched and displayed as the explanation control.

If the first recommendation object is in the unexplained state, the explanation control may be displayed in the first explanation card 20. Therefore, if it is detected that the current user triggers the explanation control, it may be determined that the second state switching operation is received, in response to the second state switching operation, the first recommendation object is switched from the unexplained state to the explained state, and the explanation control displayed in the first explanation card 20 may be further switched and displayed as the cancellation explanation control 22.

Figure 5:
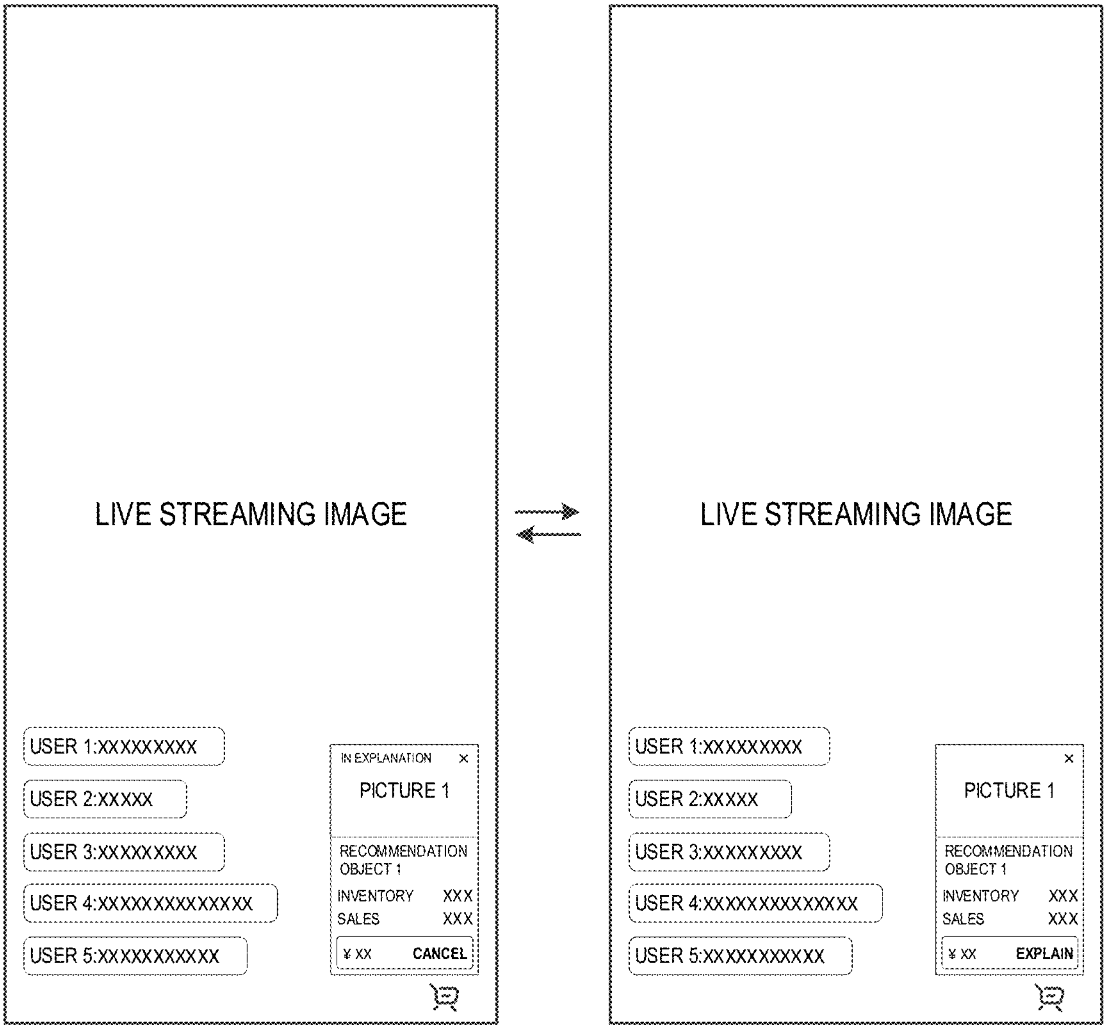
FIG. 5 is a schematic diagram of an execution manner of a state switching operation according to the embodiments of the present disclosure.

Taking the first recommendation object as the recommendation object 1 shown in FIG. 3 as an example, as shown in FIG. 5, if the recommendation object 1 is in the explained state, the cancellation explanation control may be displayed in the explanation card of the recommendation object 1. If it is detected that the cancellation explanation control is triggered by the current user, the recommendation object 1 may be switched from the explained state to the unexplained state, the cancellation explanation control displayed in the explanation card is switched and displayed as the explanation control, and the explanation card of the recommendation object 1 is displayed in the live streaming page. If the recommendation object 1 is in the unexplained state, the explanation control may be displayed in the explanation card of the recommendation object 1. If it is detected that the explanation control is triggered by the current user, the recommendation object 1 may be switched from the unexplained state to the explained state, the explanation control displayed in the explanation card is switched and displayed as the cancellation explanation control, and the explanation card of the recommendation object 1 is displayed in the live streaming page.

At S205, in response to a panel display operation acting within the first explanation card, display a recommendation object panel of the live session on the live streaming page, and display second object information of the at least one recommendation object in the recommendation object panel.

The panel display operation may be a trigger operation for indicating to display the recommendation object panel of the live session. The panel display operation may act on, but not limited to, the first explanation card. For example, the panel display operation may also act outside the first explanation card, such as acting on the panel display control displayed in the live streaming page. The execution mode of the panel display operation is not limited. For example, the panel display operation may include an operation that triggers the non-control area of the first explanation card. The non-control area may be an area where no controls are displayed.

In this embodiment, the user may be supported to perform the panel display operation in the explanation card to further enrich the trigger display mode of the recommendation object panel.

Specifically, if the panel display operation acting on the first explanation card is received, the recommendation object panel of the live session may be displayed in the live streaming page, and the second object information of the at least one recommendation object in the live session may be displayed in the recommendation object panel.

At S206: in response to a card switching operation, switch an object card displayed in the live streaming page from the first explanation card to a second explanation card, the card switching operation comprising an explanation object switching operation, the explanation object switching operation acting within the first explanation card and/or within the recommendation object panel, the explanation object switching operation being used to indicate switching a recommendation object in an explained state, and the second explanation card corresponding to a second recommendation object in the live session.

The card switching operation may be an operation for instructing to switch the currently displayed object card, for example, a trigger operation for instructing to switch to display the recommendation object of the corresponding object card in the live streaming page. The execution mode of the card switching operation is not limited. For example, the card switching operation may include, if an object card corresponding to a certain recommendation object is displayed in the live streaming page, switching a further recommendation object from the unexplained state to the explained state, such as an explanation object switching operation for the further recommended object. The explanation object switching operation may be used to indicate to switch the recommendation object that is currently in the explained state. The card switching operation may be performed in the live streaming page, such as within the explanation card or the recommendation object panel displayed in the live streaming page. For example, the explanation object switching operation may include a predetermined sliding operation acting on the first explanation card, for example, a horizontal sliding operation or a vertical sliding operation acting on the first explanation card, or the like, or may include an operation of triggering an explanation control of a certain recommendation object displayed in the recommendation object panel.

The second explanation card may be an explanation card corresponding to the card switching operation, that is, the explanation card indicated by the card switching operation. The second recommendation object may be the recommended object corresponding to the second explanation card, in other words, the second explanation card is the explanation card corresponding to the second recommended object.

Specifically, if the card switching operation is received, for example, when receiving the explanation object switching operation acting on the first explanation card or the recommendation object panel, the second recommendation object corresponding to the card switching operation may be determined, and the object card displayed in the live streaming page is switched from the first explanation card to the second explanation card corresponding to the second recommendation object, so as to meet the requirements of the user to switch to view the explanation card of different recommendation object.

Figure 6:
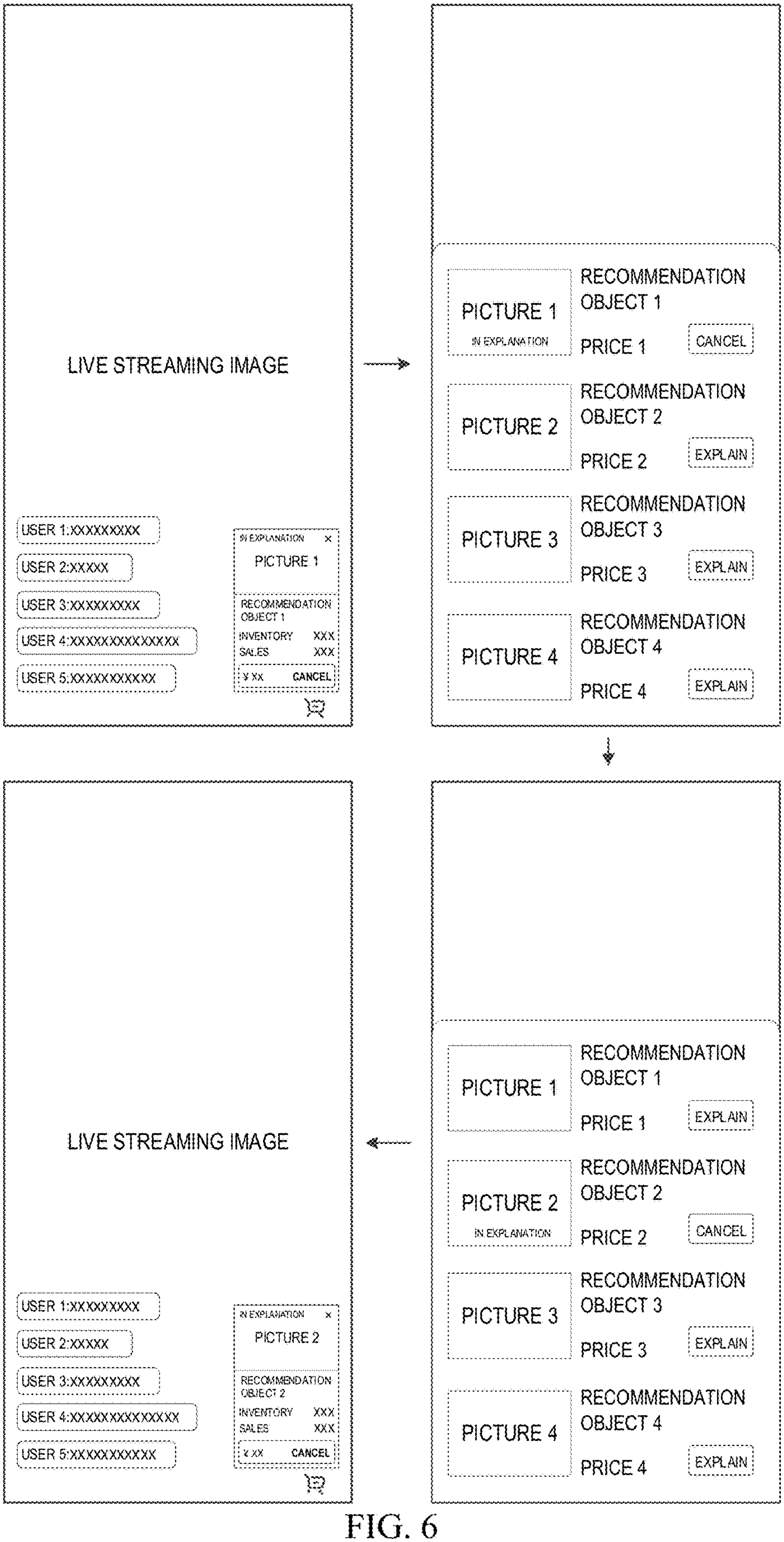
FIG. 6 is a schematic diagram of an execution manner of a card switching operation according to the embodiments of the present disclosure.

For the case in which the card switching operation is applied to the recommendation object panel, taking the first recommendation object as the recommendation object 1 shown in FIG. 3 and the second recommendation object as the recommendation object 2 shown in FIG. 3 as an example, as shown in FIG. 6, if it is detected that the current user performs a panel display operation, the recommendation object panel may be displayed in the live streaming page; if it is detected that the current user triggers an explanation control of the recommendation object 2 that is displayed in the recommendation object panel and is in the unexplained state, the recommendation object 2 may be switched from the unexplained state to the explained state, the recommendation object 1 is switched from the explained state to the unexplained state, and the explanation card displayed in the live streaming page is switched from the explanation card corresponding to the recommendation object 1 to the explanation card corresponding to the recommendation object 2.

In addition, with continued reference to FIG. 6, if it is detected that the current user triggers the explanation control of the recommendation object 2, the cancellation explanation control of the recommendation object 1 displayed in the recommendation object panel may be further switched to and displayed as the explanation control, and the explanation control of the recommendation object 2 displayed in the recommendation object panel may be switched and displayed as the cancellation explanation control.

At S207, in response to a cancel display operation for the first explanation card, cancel display of the first explanation card.

The cancel display operation may be a trigger operation used to instruct to cancel the display of the first explanation card, for example, an operation of triggering a cancel display control of the first explanation card.

In this embodiment, the user is supported to close the explanation card displayed in the live streaming page to view the page content located below the explanation card.

For example, if the cancel display operation for the first explanation card is received, for example, if it is detected that the current user triggers a cancel display control 23 displayed in the first explanation card (as shown in FIG. 2), the display of the first explanation card may be canceled. At this time, the object state of the first recommendation object may keep unchanged.

The method of interaction provided by the embodiment, the user is supported to switch the object state of the corresponding recommendation object or open the recommendation object panel through the object card, the user is supported to switch to view the object card of different recommendation object or close the currently displayed object card, the operation required for switching the object state of the recommendation object can be simplified, the trigger display mode of the recommendation object panel and the display and cancel display mode of the object card are enriched, and different interaction requirements of the user are met.

Figure 7:
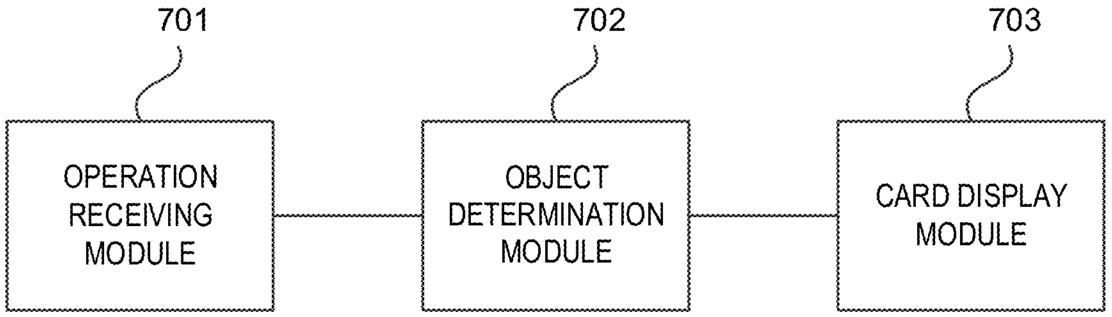
FIG. 7 is a structural block diagram of an apparatus for interaction according to the embodiments of the present disclosure.

FIG. 7 is a structural block diagram of an apparatus for interaction according to the embodiments of the present disclosure. The apparatus may be implemented by software and/or hardware, and may be configured in an electronic device, and typically, may be configured in a mobile phone or a tablet computer, and may display an explanation card of a recommendation object in a live session on a live streaming page on a live streamer side by performing a method of interaction. As shown in FIG. 7, the apparatus for interaction provided in this embodiment may include: an operation receiving module 701, an object determination module 702, and a card display module 703, wherein the operation receiving module 701 is configured to receive an explanation operation of a current user in a live streaming page, the current user being a live streamer of a live session corresponding to the live streaming page, and at least one recommendation object being present in the live session; the object determination module 702 is configured to, in response to the explanation operation, determine a first recommendation object corresponding to the explanation operation in the at least one recommendation object; the card display module 703 is configured to display a first explanation card corresponding to the first recommendation object on the live streaming page, the first explanation card being used to switch an object state of the first recommendation object, and the object state comprising an explained state and an unexplained state.

The apparatus for interaction provided in this embodiment, through the operation of receiving an explanation operation of a current user in a live streaming page, the current user being a live streamer of a live session corresponding to the live streaming page, and at least one recommendation object being present in the live session; in response to the explanation operation, determining a first recommendation object corresponding to the explanation operation in the at least one recommendation object; and displaying a first explanation card corresponding to the first recommendation object on the live streaming page, the first explanation card being used to switch an object state of the first recommendation object, and the object state comprising an explained state and an unexplained state. This embodiment adopts the above-mentioned technical solution to display an explanation card in the live streaming page on the live streamer side, and supports the live streamer to switch the object state of the corresponding recommendation object through the explanation card. There is no need to open the recommendation object panel of the live session and switch the object state in the recommendation object panel, which can simplify the operations required to switch the object states of the recommendation objects in the live broadcast room.

In the foregoing solution, first object information of the first recommendation object is displayed in the first explanation card, and the first object information comprises at least one of object description information, or resource attribute information; and/or the first explanation card is displayed outside an interaction information area of the live streaming page, and the interaction information area is a display area of interaction information in the live streaming page.

Further, the apparatus for interaction provided in this embodiment may further include at least one of: a state switching module configured to, after displaying the first explanation card corresponding to the first recommendation object on the live streaming page, in response to a state switching operation acting within the first explanation card, switch the object state of the first recommendation object; a panel display module configured to, after displaying the first explanation card corresponding to the first recommendation object on the live streaming page, in response to a panel display operation acting within the first explanation card, display a recommendation object panel of the live session on the live streaming page, and display second object information of the at least one recommendation object in the recommendation object panel; a card switching module configured to, after displaying the first explanation card corresponding to the first recommendation object on the live streaming page, in response to a card switching operation, switch an object card displayed on the live streaming page from the first explanation card to a second explanation card, the card switching operation comprising an explanation object switching operation, the explanation object switching operation acting within the first explanation card and/or within the recommendation object panel, the explanation object switching operation being used to indicate switching a recommendation object in an explained state, and the second explanation card corresponding to a second recommendation object in the live session; or a cancellation display module configured to, after displaying the first explanation card corresponding to the first recommendation object on the live streaming page, in response to a cancel display operation for the first explanation card, cancel display of the first explanation card.

In the above solution, the state switching module may be configured to: in response to a first state switching operation acting within the first explanation card, switch the first recommendation object from the explained state to the unexplained state, and maintain display of the first explanation card on the live streaming page; in response to a second state switching operation acting within the first explanation card, switch the first recommendation object from the unexplained state to the explained state, and maintain display of the first explanation card on the live streaming page.

In the foregoing solution, the card display module 703 may be configured to: display the first explanation card corresponding to the first recommendation object on the live streaming page, and adjust the first recommendation object to the explained state.

In the foregoing solution, the first explanation card comprises an information area and an interaction area, the information area is used for displaying at least part of first object information of the first recommendation object, the interaction area is used for displaying a state switching control, and the state switching control is used for triggering execution of a state switching operation.

Further, the apparatus for interaction provided in this embodiment may further include: an order adjustment module configured to, upon the object state of the first recommendation object is switched, adjust the display order of second object information of the first recommendation object in a recommendation object panel of the live session.

In the above solution, the order adjustment module may be configured to perform at least one of: in response to the first recommendation object being switched from the unexplained state to the explained state, add the second object information of the first recommendation object at a target position in the display order and maintain the second object information of the first recommendation object at an original position in the display order; or adjust the second object information of the first recommendation object from the original position in the display order to the target position in the display order; or in response to the first recommendation object being switched from the explained state to the unexplained state, remove the second object information of the first recommendation object at the target position in the display order and maintain the second object information of the first recommendation object at the original position in the display order; or adjust the second object information of the first recommendation object from the target position in the display order to the original position in the display order.

The apparatus for interaction provided in the embodiments of the present disclosure may perform the method of interaction provided by any embodiment of the present disclosure, and has functional modules and beneficial effects corresponding to the execution method of interaction. For technical details not described in detail in this embodiment, reference may be made to the method of interaction provided by any embodiment of the present disclosure.

Figure 8:
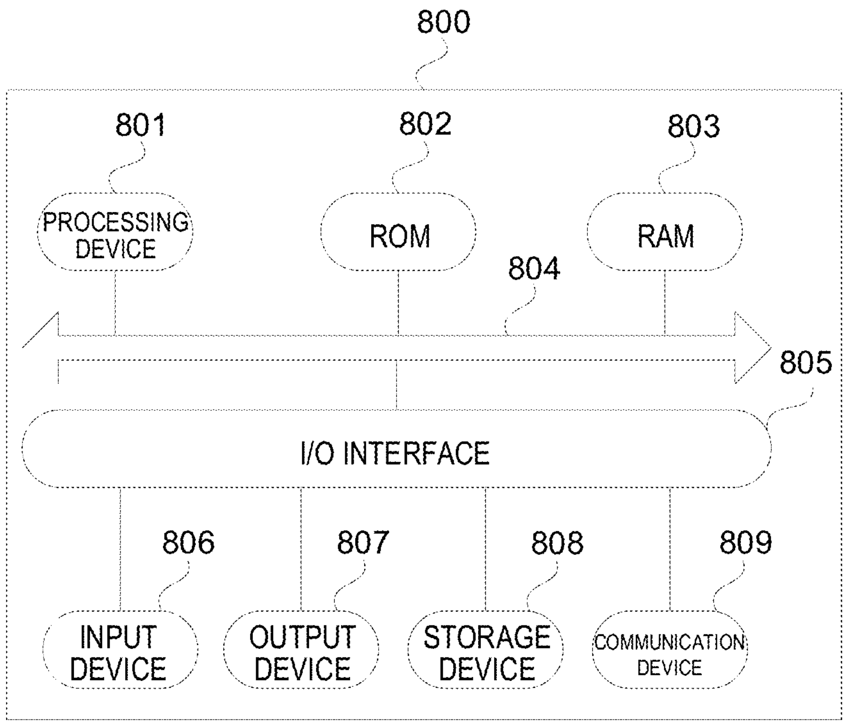
FIG. 8 is a schematic structural diagram of an electronic device according to the embodiments of the present disclosure.

The following refers to FIG. 8, which is a schematic structural diagram of an electronic device 800 (such as the terminal device) suitable for implementing the embodiments of the present disclosure. The terminal device in the embodiments of the present disclosure may include a mobile terminal such as a mobile phone, a notebook computer, a digital broadcast receiver, a personal digital assistant (PDA), a portable android device (PAD), a portable media player (PMP), an in-vehicle terminal (for example, an in-vehicle navigation terminal), and a fixed terminal such as a digital television (TV), a desktop computer, or the like. The electronic device shown in FIG. 8 is merely an example.

As shown in FIG. 8, the electronic device 800 may include a processing device 801 (for example, a central processor, a graphics processor, etc.), which may perform various appropriate actions and processing according to a program stored in a read only memory (ROM) 802 or a program loaded into a random access memory (RAM) 803 from a storage device 808. In the RAM 803, various programs and data required by the operation of the electronic device 800 are also stored. The processing device 801, the ROM 802, and the RAM 803 are connected to each other through a bus 804. An input/output (I/O) interface 805 is also connected to the bus 804.

Generally, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, a magnetic tape, a hard disk, etc.; and a communication device 809. The communication device 809 may allow the electronic device 800 to communicate wirelessly or wired with other devices to exchange data. While FIG. 8 shows an electronic device 800 having various devices, it should be understood that it is not required to implement or have all illustrated devices. More or fewer devices may alternatively be implemented or provided.

In particular, according to the embodiments of the present disclosure, the process described above with reference to the flowchart may be implemented as a computer software program according to the embodiments of the present disclosure. For example, the embodiments of the present disclosure include a computer program product comprising a computer program embodied on a non-transitory computer readable medium, the computer program comprising program code for performing the method shown in the flowchart. In such embodiment, the computer program may be downloaded and installed from the network through the communication device 809, or installed from the storage device 808, or from the ROM 802. When the computer program is executed by the processing device 801, the foregoing functions defined in the method of the embodiments of the present disclosure are performed.

It should be noted that in the context of the present disclosure, a computer readable medium may be a tangible medium that may contain or store a program for use by or in conjunction with an instruction execution system, apparatus, or device. The computer readable medium may be a computer readable signal medium or a computer readable storage medium or any combination of the two. The computer readable storage medium may be, for example, but is not limited to: an electrical, magnetic, optical, electromagnetic, infrared, or semiconductor system, apparatus, or device, or any combination thereof. More specific examples of computer readable storage medium may include, but are not limited to: an electrical connection having one or more wires, a portable computer disk, a hard drive, a random access memory (RAM), a read only memory (ROM), an erasable programmed read-only memory (EPROM or flash memory), fiber optics, a portable compact disk read-only memory (CD-ROM), an optical storage device, an magnetic storage device, or any suitable combination of the above. In the present disclosure, a computer readable storage medium may be any tangible medium that contains or stores a program for use by or in connection with an instruction execution system, apparatus, or device. In the present disclosure, a computer readable signal medium may include a data signal propagated in a baseband or as part of a carrier wave, carrying computer readable program code therein. Such propagated data signal may take many forms, including but not limited to electromagnetic signals, optical signals, or any suitable combination of the above. A computer readable signal medium may also be any computer readable medium other than a computer readable storage medium that may send, propagate, or transmit a program for use by or in connection with an instruction execution system, apparatus, or device.

Program code embodied on a computer readable medium may be transmitted using any suitable medium, including but not limited to: wire, optical cable, RF (radio frequency), etc., or any suitable combination of the above.

In some implementations, clients and servers can communicate with any currently known or future developed network protocol such as HyperText Transfer Protocol (HTTP) and can interconnect with any form or medium of digital data communication (e.g., communication networks). Examples of communication networks include local area networks (LANs), wide area networks (WANs), the Internet (such as the Internet), and end-to-end networks (e.g., ad hoc end-to-end networks), as well as any currently known or future developed networks.

The computer-readable medium described above may be included in the electronic device; or may be separately present without being assembled into the electronic device.

The computer-readable medium carries one or more programs, and when the one or more programs are executed by the electronic device, the electronic device is caused to: receive an explanation operation of a current user in a live streaming page, the current user being a live streamer of a live session corresponding to the live streaming page, and at least one recommendation object being present in the live session; in response to the explanation operation, determine a first recommendation object corresponding to the explanation operation in the at least one recommendation object; and display a first explanation card corresponding to the first recommendation object on the live streaming page, the first explanation card being used to switch an object state of the first recommendation object, and the object state comprising an explained state and an unexplained state.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The modules described in the embodiments of the present disclosure may be implemented by way of software or hardware. In some cases, the names of the modules do not constitute limitations to the modules themselves.

The functions described above may be performed, at least in part, by one or more hardware logic components. For example, without limitation, example types of hardware logic components that may be used include: field programmable gate arrays (FPGAs), application specific integrated circuits (ASICs), application specific standard products (ASSPs), system-on-a-chip (SOCs), complex programmable logic devices (CPLDs), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a RAM, a ROM, an EPROM or a flash memory, an optical fiber, a CD-ROM, an optical storage device, a magnetic storage device, or any suitable combination thereof.

According to one or more embodiments of the present disclosure, Example 1 provides a method of interaction, including: receiving an explanation operation of a current user in a live streaming page, the current user being a live streamer of a live session corresponding to the live streaming page, and at least one recommendation object being present in the live session; in response to the explanation operation, determining a first recommendation object corresponding to the explanation operation in the at least one recommendation object; and displaying a first explanation card corresponding to the first recommendation object on the live streaming page, the first explanation card being used to switch an object state of the first recommendation object, and the object state comprising an explained state and an unexplained state.

According to one or more embodiments of the present disclosure, Example 2 is based on the method of Example 1, first object information of the first recommendation object is displayed in the first explanation card, and the first object information comprises at least one of object description information, or resource attribute information; and/or the first explanation card is displayed outside an interaction information area of the live streaming page, and the interaction information area is a display area of interaction information in the live streaming page.

According to one or more embodiments of the present disclosure, Example 3 is based on the method of Example 1, after displaying the first explanation card corresponding to the first recommendation object on the live streaming page, further comprising at least one of in response to a state switching operation acting within the first explanation card, switching the object state of the first recommendation object; in response to a panel display operation acting within the first explanation card, displaying a recommendation object panel of the live session on the live streaming page, and displaying second object information of the at least one recommendation object in the recommendation object panel; in response to a card switching operation, switching an object card displayed on the live streaming page from the first explanation card to a second explanation card, the card switching operation comprising an explanation object switching operation, the explanation object switching operation acting within the first explanation card and/or within the recommendation object panel, the explanation object switching operation being used to indicate switching a recommendation object in an explained state, and the second explanation card corresponding to a second recommendation object in the live session; or in response to a cancel display operation for the first explanation card, canceling display of the first explanation card.

According to one or more embodiments of the present disclosure, Example 4 is based on the method of Example 3, the in response to the state switching operation acting within the first explanation card, switching the object state of the first recommendation object comprises: in response to a first state switching operation acting within the first explanation card, switching the first recommendation object from the explained state to the unexplained state, and maintaining display of the first explanation card on the live streaming page; in response to a second state switching operation acting within the first explanation card, switching the first recommendation object from the unexplained state to the explained state, and maintaining display of the first explanation card on the live streaming page.

According to one or more embodiments of the present disclosure, Example 5 is based on the method of Example 3, the displaying the first explanation card corresponding to the first recommendation object on the live streaming page comprises: displaying the first explanation card corresponding to the first recommendation object on the live streaming page, and adjusting the first recommendation object to the explained state.

According to one or more embodiments of the present disclosure, Example 6 is based on the method of Examples 2-5, wherein the first explanation card comprises an information area and an interaction area, the information area is used for displaying at least part of first object information of the first recommendation object, the interaction area is used for displaying a state switching control, and the state switching control is used for triggering execution of a state switching operation.

According to one or more embodiments of the present disclosure, Example 7 is based on the method of Examples 1-5, further comprising: upon the object state of the first recommendation object is switched, adjusting the display order of second object information of the first recommendation object in a recommendation object panel of the live session.

According to one or more embodiments of the present disclosure, Example 7 is based on the method of Example 7, wherein the upon the object state of the first recommendation object is switched, adjusting the display order of the second object information of the first recommendation object in a recommendation object panel of the live session comprises at least one of: in response to the first recommendation object being switched from the unexplained state to the explained state, adding the second object information of the first recommendation object at a target position in the display order and maintaining the second object information of the first recommendation object at an original position in the display order; or adjusting the second object information of the first recommendation object from the original position in the display order to the target position in the display order; or in response to the first recommendation object being switched from the explained state to the unexplained state, removing the second object information of the first recommendation object at the target position in the display order and maintaining the second object information of the first recommendation object at the original position in the display order; or adjusting the second object information of the first recommendation object from the target position in the display order to the original position in the display order.

According to one or more embodiments of the present disclosure, an apparatus for interaction is provided according to Example 9, including: an operation receiving module configured to receive an explanation operation of a current user in a live streaming page, the current user being a live streamer of a live session corresponding to the live streaming page, and at least one recommendation object being present in the live session; an object determination module configured to, in response to the explanation operation, determine a first recommendation object corresponding to the explanation operation in the at least one recommendation object; and a card display module configured to display a first explanation card corresponding to the first recommendation object on the live streaming page, the first explanation card being used to switch an object state of the first recommendation object, and the object state comprising an explained state and an unexplained state.

According to one or more embodiments of the present disclosure, Example 10 provides an electronic device, including: one or more processors; and a memory configured to store one or more programs, and when the one or more programs are executed by the one or more processors, the one or more processors implement the method of interaction according to any of Examples 1-8.

According to one or more embodiments of the present disclosure, Example 11 provides a computer-readable storage medium having stored thereon a computer program, the program, when executed by a processor, implements the method of interaction according to any of Examples 1-8.

The above description is merely an illustration of the preferred embodiments of the present disclosure and the principles of the applied technology. It should be understood by those skilled in the art that the disclosure in the present disclosure is not limited to the technical solutions of the specific combination of the above technical features and should also cover other technical solutions formed by any combination of the above technical features or their equivalent features without departing from the above disclosed concept. For example, the above features are the technical solutions formed by mutually replacing technical features disclosed in the present disclosure (but not limited to).

Further, while operations are depicted in a particular order, this should not be understood to require that these operations be performed in the particular order shown or in sequential order. In certain circumstances, multitasking and parallel processing may be advantageous. Likewise, while several specific implementation details are included in the discussion above, these should not be construed as limiting the scope of the present disclosure. Certain features described in the context of separate embodiments may also be implemented in combination in a single embodiment. Conversely, the various features described in the context of a single embodiment may also be implemented in multiple embodiments either individually or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

We claim:

1. A method of interaction, comprising:

receiving an explanation operation of a current user in a live streaming page, the current user being a live streamer of a live session corresponding to the live streaming page, and at least one recommendation object being present in the live session;

in response to the explanation operation, determining a first recommendation object corresponding to the explanation operation in the at least one recommendation object;

displaying a first explanation card corresponding to the first recommendation object on the live streaming page, the first explanation card being used to switch an object state of the first recommendation object, and the object state comprising an explained state and an unexplained state; and in response to switching the object state of the first recommendation object, adjusting a display order of second object information of the first recommendation object in a recommendation object panel of the live session.

2. The method of claim 1, wherein first object information of the first recommendation object is displayed in the first explanation card, and the first object information comprises at least one of object description information, or resource attribute information; and/or the first explanation card is displayed outside an interaction information area of the live streaming page, and the interaction information area is a display area of interaction information in the live streaming page.

3. The method of claim 2, wherein the first explanation card comprises an information area and an interaction area, the information area is used for displaying at least part of first object information of the first recommendation object, the interaction area is used for displaying a state switching control, and the state switching control is used for triggering execution of a state switching operation.

4. The method of claim 1, wherein after displaying the first explanation card corresponding to the first recommendation object on the live streaming page, the method further comprises at least one of:

in response to a state switching operation acting within the first explanation card, switching the object state of the first recommendation object;

in response to a panel display operation acting within the first explanation card, displaying a recommendation object panel of the live session on the live streaming page, and displaying second object information of the at least one recommendation object in the recommendation object panel;

in response to a card switching operation, switching an object card displayed on the live streaming page from the first explanation card to a second explanation card, the card switching operation comprising an explanation object switching operation, the explanation object switching operation acting within the first explanation card and/or within the recommendation object panel, the explanation object switching operation being used to indicate switching a recommendation object in an explained state, and the second explanation card corresponding to a second recommendation object in the live session; or in response to a cancel display operation for the first explanation card, canceling display of the first explanation card.

5. The method of claim 4, wherein switching the object state of the first recommendation object in response to the state switching operation acting within the first explanation card comprises:

in response to a first state switching operation acting within the first explanation card, switching the first recommendation object from the explained state to the unexplained state, and maintaining display of the first explanation card on the live streaming page;

in response to a second state switching operation acting within the first explanation card, switching the first recommendation object from the unexplained state to the explained state, and maintaining display of the first explanation card on the live streaming page.

6. The method of claim 4, wherein the displaying the first explanation card corresponding to the first recommendation object on the live streaming page comprises:

displaying the first explanation card corresponding to the first recommendation object on the live streaming page, and adjusting the first recommendation object to the explained state.

7. The method of claim 1, wherein the adjusting the display order of the second object information of the first recommendation object in the recommendation object panel of the live session comprises at least one of:

in response to the first recommendation object being switched from the unexplained state to the explained state, adding the second object information of the first recommendation object at a target position in the display order and maintaining the second object information of the first recommendation object at an original position in the display order; or adjusting the second object information of the first recommendation object from the original position in the display order to the target position in the display order; or in response to the first recommendation object being switched from the explained state to the unexplained state, removing the second object information of the first recommendation object at the target position in the display order and maintaining the second object information of the first recommendation object at the original position in the display order; or adjusting the second object information of the first recommendation object from the target position in the display order to the original position in the display order.

8. An electronic device, comprising:

at least one processor; and a memory communicatively connected to the at least one processor, wherein the memory stores a computer program executable by the at least one processor, and the computer program is executed by the at least one processor to enable the at least one processor to perform acts comprising:

receiving an explanation operation of a current user in a live streaming page, the current user being a live streamer of a live session corresponding to the live streaming page, and at least one recommendation object being present in the live session;

in response to the explanation operation, determining a first recommendation object corresponding to the explanation operation in the at least one recommendation object;

displaying a first explanation card corresponding to the first recommendation object on the live streaming page, the first explanation card being used to switch an object state of the first recommendation object, and the object state comprising an explained state and an unexplained state; and in response to switching the object state of the first recommendation object, adjusting a display order of second object information of the first recommendation object in a recommendation object panel of the live session.

9. The electronic device of claim 8, wherein first object information of the first recommendation object is displayed in the first explanation card, and the first object information comprises at least one of object description information, or resource attribute information; and/or the first explanation card is displayed outside an interaction information area of the live streaming page, and the interaction information area is a display area of interaction information in the live streaming page.

10. The electronic device of claim 9, wherein the first explanation card comprises an information area and an interaction area, the information area is used for displaying at least part of first object information of the first recommendation object, the interaction area is used for displaying a state switching control, and the state switching control is used for triggering execution of a state switching operation.

11. The electronic device of claim 8, wherein after displaying the first explanation card corresponding to the first recommendation object on the live streaming page, the acts further comprise at least one of:

in response to a state switching operation acting within the first explanation card, switching the object state of the first recommendation object;

in response to a panel display operation acting within the first explanation card, displaying a recommendation object panel of the live session on the live streaming page, and displaying second object information of the at least one recommendation object in the recommendation object panel;

in response to a card switching operation, switching an object card displayed on the live streaming page from the first explanation card to a second explanation card, the card switching operation comprising an explanation object switching operation, the explanation object switching operation acting within the first explanation card and/or within the recommendation object panel, the explanation object switching operation being used to indicate switching a recommendation object in an explained state, and the second explanation card corresponding to a second recommendation object in the live session; or in response to a cancel display operation for the first explanation card, canceling display of the first explanation card.

12. The electronic device of claim 11, wherein switching the object state of the first recommendation object in response to the state switching operation acting within the first explanation card comprises:

in response to a first state switching operation acting within the first explanation card, switching the object state of the first recommendation object from the explained state to the unexplained state, and maintaining display of the first explanation card on the live streaming page;

in response to a second state switching operation acting within the first explanation card, switching the object state of the first recommendation object from the unexplained state to the explained state, and maintaining display of the first explanation card on the live streaming page.

13. The electronic device of claim 11, wherein the displaying the first explanation card corresponding to the first recommendation object on the live streaming page comprises:

displaying the first explanation card corresponding to the first recommendation object on the live streaming page, and adjusting the object state of the first recommendation object to the explained state.

14. The electronic device of claim 8, wherein the adjusting the display order of the second object information of the first recommendation object in the recommendation object panel of the live session comprises at least one of:

in response to the object state of the first recommendation object being switched from the unexplained state to the explained state, adding the second object information of the first recommendation object at a target position in the display order and maintaining the second object information of the first recommendation object at an original position in the display order; or adjusting the second object information of the first recommendation object from the original position in the display order to the target position in the display order; or in response to the object state of the first recommendation object being switched from the explained state to the unexplained state, removing the second object information of the first recommendation object at the target position in the display order and maintaining the second object information of the first recommendation object at the original position in the display order; or adjusting the second object information of the first recommendation object from the target position in the display order to the original position in the display order.

15. A non-transitory computer readable storage medium storing computer instructions, which, when executed by a processor, implement acts comprising:

receiving an explanation operation of a current user in a live streaming page, the current user being a live streamer of a live session corresponding to the live streaming page, and at least one recommendation object being present in the live session;

in response to the explanation operation, determining a first recommendation object corresponding to the explanation operation in the at least one recommendation object;

displaying a first explanation card corresponding to the first recommendation object on the live streaming page, the first explanation card being used to switch an object state of the first recommendation object, and the object state comprising an explained state and an unexplained state; and in response to switching the object state of the first recommendation object, adjusting a display order of second object information of the first recommendation object in a recommendation object panel of the live session.

16. The non-transitory computer readable storage medium of claim 15, wherein first object information of the first recommendation object is displayed in the first explanation card, and the first object information comprises at least one of object description information, or resource attribute information; and/or the first explanation card is displayed outside an interaction information area of the live streaming page, and the interaction information area is a display area of interaction information in the live streaming page.

17. The non-transitory computer readable storage medium of claim 15, wherein after displaying the first explanation card corresponding to the first recommendation object on the live streaming page, the acts further comprise at least one of:

in response to a state switching operation acting within the first explanation card, switching the object state of the first recommendation object;

in response to a panel display operation acting within the first explanation card, displaying a recommendation object panel of the live session on the live streaming page, and displaying second object information of the at least one recommendation object in the recommendation object panel;

in response to a card switching operation, switching an object card displayed on the live streaming page from the first explanation card to a second explanation card, the card switching operation comprising an explanation object switching operation, the explanation object switching operation acting within the first explanation card and/or within the recommendation object panel, the explanation object switching operation being used to indicate switching a recommendation object in an explained state, and the second explanation card corresponding to a second recommendation object in the live session; or in response to a cancel display operation for the first explanation card, canceling display of the first explanation card.

18. The non-transitory computer readable storage medium of claim 17, wherein switching the object state of the first recommendation object in response to the state switching operation acting within the first explanation card comprises:

in response to a first state switching operation acting within the first explanation card, switching the object state of the first recommendation object from the explained state to the unexplained state, and maintaining display of the first explanation card on the live streaming page;

in response to a second state switching operation acting within the first explanation card, switching the object state of the first recommendation object from the unexplained state to the explained state, and maintaining display of the first explanation card on the live streaming page.

* * * * *